US006762407B2

(12) United States Patent
Kalinitchenko

(10) Patent No.: US 6,762,407 B2
(45) Date of Patent: Jul. 13, 2004

(54) MASS SPECTROMETER INCLUDING A QUADRUPOLE MASS ANALYZER ARRANGEMENT

(75) Inventor: Iouri Kalinitchenko, Mulgrave (AU)

(73) Assignee: Varian Australia PTY LTD, Mulgrave (AU)

( * ) Notice: Subject to any disclaimer, the term of this patent is extended or adjusted under 35 U.S.C. 154(b) by 102 days.

(21) Appl. No.: 10/089,706

(22) PCT Filed: Aug. 17, 2001

(86) PCT No.: PCT/AU01/01024

§ 371 (c)(1),
(2), (4) Date: Mar. 29, 2002

(87) PCT Pub. No.: WO01/91159

PCT Pub. Date: Nov. 29, 2001

(65) Prior Publication Data

US 2003/0155496 A1 Aug. 21, 2003

(30) Foreign Application Priority Data

Apr. 27, 2001 (AU) ............................................. PR4651

(51) Int. Cl.[7] .......................... H01J 49/00; B01D 59/44

(52) U.S. Cl. ........................ 250/294; 250/281; 250/296

(58) Field of Search ................................. 250/281, 282, 250/292, 294, 296, 297, 288

(56) References Cited

U.S. PATENT DOCUMENTS 3,371,204 A * 2/1968 Brubaker .................... 250/292
3,410,997 A * 11/1968 Brubaker .................... 250/290
3,473,020 A * 10/1969 Brubaker .................... 250/290
5,939,718 A * 8/1999 Yamada et al. ............. 250/288
6,614,021 B1 * 9/2003 Kalinitchenko ............. 250/294

FOREIGN PATENT DOCUMENTS

EP 0237259 * 9/1987 ............ H01J/49/42
EP 237259 A2 * 9/1987 ............ H01J/49/42

OTHER PUBLICATIONS

Book by Peter Dawson, entitled "Quadrupole Mass Spectrometry and Its Applications", published by Elevier Scientifice Publishing Company, 1976, pp. 104–107.
Article by Douglas, DJ, entitled "Some Current Perspectives on ICP–MS", published by Canadian Journal of Spectroscopy, vol. 34, No. 2, 1989, pp. 38–49.

* cited by examiner

*Primary Examiner*—Nikita Wells
*Assistant Examiner*—Christopher M. Kalivoda
(74) *Attorney, Agent, or Firm*—Bella Fishman

(57) ABSTRACT

A mass spectrometer having an ion optics system in a first vacuum region, which diverts ions travelling in a first direction from a source, characterized by an initial pressure, through an angle such that neutral particles and photons from the source continue in the first direction and are removed. The diverted ion beam is then directed into a quadrupole mass analyzer arrangement in a second vacuum region, which comprises a set of fringe electrodes followed by a linear mass analyzer and then an ion detector. The first vacuum region is characterized by a pressure intermediate the initial pressure and a second vacuum region pressure. The set of quadrupole fringe electrodes are configured to divert the ion beam prior to passage of the ion beam into the linear quadrupole mass analyzer and to shield the linear quadrupole mass analyzer entrance from a substantial portion of the trajectory of the ion beam in the first vacuum region.

15 Claims, 7 Drawing Sheets

MASS SPECTROMETER INCLUDING A QUADRUPOLE MASS ANALYZER ARRANGEMENT

TECHNICAL FIELD

The present invention relates to a mass spectrometer that includes an improved quadrupole mass analyser arrangement. The invention will be described mainly with reference to an inductively coupled plasma-mass spectrometer (ICP-MS) having an inductively coupled plasma ion source, however it is to be understood that the invention encompasses other types of mass spectrometers employing other types of ion sources, examples of which are disclosed hereinbelow.

BACKGROUND

The subject disclosure refers to a mass spectrometer having an ion reflecting or an ion transmissive optics system. The spectrometer includes an ion source for providing a supply of particles including ions representative of chemical elements present in an analytical sample and an ion optics system between the ion source and a mass analyzer for producing a beam of ions from the source and establishing a reflecting electrostatic field for reflecting ions form the beam through an angle, for example 90°, and for focussing them into the mass analyzer entrance.

It has been found that the present invention as embodied in an ICP-MS instrument gives excellent sensitivity for detection of elemental isotopes having relatively high atomic masses (for example, the sensitivity for thorium, atomic mass 232, was over 650,000 counts per second per microgram per liter). However the sensitivity for elemental isotopes having low atomic masses is relatively poor (for example the sensitivity for beryllium, atomic mass 9, was less than 10,000 counts per second per microgram per liter). Furthermore, the background count rate (the count rate detected at a selected mass-to-charge ratio when no ions having that selected mass-to-charge ratio where expected to be present) was higher than desired, and when the voltages applied to the ion optics electrodes were increased to improve the focussing to increase sensitivity for detection of low atomic mass isotopes, the background count rate unfavourably increased.

The best possible Limit of Detection (LOD) for an elemental isotope in an ICP-MS is given by $$LOD=3\times(\text{background count rate/measurement time})^{1/2}/\text{sensitivity}$$

Thus the relatively high background count rates and relatively low sensitivities for elemental isotopes having low atomic masses means that detection limits for such low atomic mass isotopes are undesirably high.

Although this problem has been highlighted by use of a mass spectrometer which employs a reflecting ion optics system, it is considered (in view of what is thought to be the mechanism for causing the high background count rates, as explained hereinbelow) that the same problem would exist in mass spectrometers that do not use a reflecting ion optics system.

It is known to arrange a separate set of four short straight sections of rod at the entrance of a quadrupole mass analyser and operate them with only radio-frequency (rf) voltage applied thereto or with the ratio of the DC to AC voltage substantially zero. Such a set of rods is often known as "fringe rods" because their function is to alleviate the effect of the fringing fields at the entrance of a quadrupole mass analyser and so improve the efficiency of transmission of ions into the mass analyser (see Peter H Dawon's book "Quadrupole Mass Spectrometry and its Applications", Elsevier Scientific Publishing Co., 1976, at p. 105 and FIG. 1(*b*); and the earlier disclosure of U.S. Pat. No. 3,371,204 (Wilson M Brubaker)). While these straight fringe rods are not directly related to the problem of excessive background in quadrupole mass spectrometry, similar structures have been involved in efforts to solve that problem.

Thus U.S. Pat. No. 3,473,020 (Wilson M Brubaker) discloses a quadrupole mass filter having a curvilinear entrance section and a rectilinear section. A charged particle source directs particles (normally ions) into the analyser where they are resolved and the sorted beam is then directed into a detector section. The curvilinear quadrupole section can be operated in a strong focussing mode with low resolving power such that ions in a small mass range are transmitted from this section into the quadrupole rectilinear section of high resolving power. The curvilinear entrance section also reduces the number of photons from the charged particle source reaching the analyser detector and thus provides a substantial improvement in the signal to noise ratio in the output of the analyser. This arrangement would also remove neutral particles emanating from the source as well as photons because these particles would not be affected by the electrostatic field in the curved quadrupole section and so would continue straight ahead and strike the curved electrode rods. In a subsequent U.S. Pat. No. 3,410,997, Brubaker discloses the use of a similar curved quadrupole section at the exit of a linear quadrupole mass analyser to separate ions from photons from the source. It is disclosed that this curved quadrupole section may be operated with AC voltages only.

Peter H Dawson in his above mentioned book "Quadrupole Mass Spectrometry and its Applications" at pp 34–35 describes that background signal limits the ability to measure trace concentrations and originates from excited neutrals which easily pass through the "line-of-sight" analyser. He goes on to describe that "curved quadrupoles . . . or curved sections . . . have also been used to avoid the problem".

European Patent Application 0 237 259 A2 (J. E. P. Syka) discloses tandem quadrupole mass spectrometer arrangements that include a bent quadrupole placed in front of a mass analysing quadrupole for reducing output noise. This bent quadrupole removes fast neutral particles generated in the ion source or from a collision cell (for producing daughter ions) in front of the bent quadrupole. In Syka's invention the bent quadrupole is separated from the mass analysing quadrupole by aperture plates and electrostatic lenses. The bent quadrupole does not act as a set of 'fringe rods'.

D. J. Douglas in his article "Some Current Perspectives on ICP-MS" (Canadian Journal of Spectroscopy, Vol. 34, No. 2, 1989, pp 38–49) reported, in relation to seeking to reduce the high level of background noise in inductively coupled plasma mass spectrometry, the use of a curved (90°) RF only quadrupole (which he terms a "bent quad") at the exit of the analysing quadrupole, which is essentially the same arrangement as that disclosed by Brubaker in U.S. Pat. No. 3,410,997. Douglas states, however, that the background noise (i.e. count rate) was a strong function of mass, that is, for high mass ions the background was reduced dramatically, but for low masses the background remained high (which is similar to the problem described hereinbefore in relation to the invention of WO 00/17909). Douglas describes, "Apparently at the exit of the analysing quadrupole, photons or metastable atoms from the source were somehow producing low mass ions which were efficiently transmitted to the detector to produce a high background level. When the voltage on the RF quad was high (corresponding to high mass analytes) these low mass ions had unstable trajectories and were not transmitted. Thus the "bent quad" almost but did not quite solve the background problem" (ibid p.41).

U.S. Pat. No. 5,939,718 (N. Yamada et al) discloses an ICP-MS having an ion lens section, including a multipole (at least four electrode rods) ion beam guide located in front of mass filtering and ion detection sections. In some embodiments (FIGS. 9–12) the rods of the ion beam guide are tilted or bent with respect to the moving direction of an ion beam "so as to prevent an (sic) direct entrance of photons of light from an inductively coupled plasma into (the) mass filter . . . Consequently the noise from direct light can be reduced . . . and it can highly enhance the S/N ratio and the measurement accuracy." Thus this patent addresses a problem that is essentially the same as that addressed in U.S. Pat. No. 3,473,020 (Brubaker) and claims a solution that is generally similar, but specifically applied to an inductively coupled plasma mass spectrometer.

According to the disclosure in Yamada et al. U.S. Pat. No. 5,939,718, the bent ion guide is separated from the mass analysing quadrupole by an aperture plate. The bent ion guide therefore does not act as a set of 'fringe rods'. Because of this aperture the mass filter in Yamada et al. U.S. Pat. No. 5,939,718 does not directly receive ions from the ion guide. Instead the ion guide is located in an ion lens vacuum chamber and the mass filter in an analyser vacuum chamber such that the ions must pass through an aperture between the two chambers. Such an aperture plate would introduce distortions in the electric fields associated with the ion guide and the mass filter which, together with different vacuum levels in the two chambers, may cause some unwanted effects on the ions and thus contribute to the background noise (particularly in view of what is thought to be the mechanism for causing the high background count rates in relation to the invention of WO 00/17909, as explained hereinbelow).

The above disclosed prior art documents show the use of curved or tilted ion guides to remove unwanted particles (i.e. neutrals and photons) which emanate from a source. The effect of such ion guides is to locate the mass filter and/or ion detector "off-axis" or out of a "line-of-sight" from the ion source. They do not address the problem of a high background count rate still occurring in an arrangement in which neutrals and photons emanating from a source have already been removed.

An object of the present invention is to provide a mass spectrometer that employs a quadrupole mass analyser which has an improved (that is, a low) limit of detection for elemental isotopes of low atomic masses. The mass spectrometer may employ either a transmissive or reflecting ion optics system.

DISCLOSURE OF THE INVENTION

According to the invention there is provided a mass spectrometer including,

- a source for producing particles including ions representative of chemical elements in a sample together with neutral particles and photons,
- an ion optics system contained in a first vacuum region for receiving particles from the source, the ion optics system including
  - at least one first electrode for establishing an electrostatic field for directing a beam of said ions in a first direction from the source and at least one second electrode for establishing an electrostatic field for diverting the beam of ions from the first direction through an angle whereby neutral particles and photons emanating from the source continue in the first direction and are separated from the beam of ions,
- a quadrupole mass analyser arrangement contained in a second vacuum region and including
  - a set of quadrupole fringe electrodes for receiving the beam of ions and a linear quadrupole mass analyser for receiving ions directly from the set of quadrupole fringe electrodes, and an ion detector also contained in the second vacuum region for receiving ions from the linear quadrupole mass analyser,
  - wherein the set of quadrupole fringe electrodes are configured to divert the ions prior to their passage into the linear quadrupole mass analyser and to shield the entrance of the linear quadrupole mass analyser.

It has been discovered that the use of a configured set of quadrupole fringe electrodes immediately in front of a linear mass analyser as disclosed in the preceding paragraph and after neutrals and photons from the source have been removed, significantly improves the limit of detection for elemental isotopes of low atomic masses. This is principally because the configured set of quadrupole fringe electrodes of the quadrupole mass analyser arrangement have the effect of reducing the background count rate to a very low figure, even when the voltages of the preceding ion optics elements are set to values that favour the transmission of isotopes of low atomic masses. Without the set of quadrupole fringe electrodes the background count rate at such voltages is unacceptably high. Use of the configured set of fringe electrodes thus permits an increase in sensitivity for low mass isotopes along with a decrease in the background count rate. Both these factors contribute to the improved limits of detection for isotopes of low atomic mass.

It is thought that the reduction of the background count rate is due to the configured quadrupole fringe electrodes preventing the entry of energetic neutral particles into the linear quadrupole mass analyser, such energetic neutral particles possibly being produced by acceleration of the sample ions through residual gas in the spectrometer, which can occur whether those sample ions are directed by either a transmissive or reflecting ion optics system. Whatever the origin of the species causing the high background may be, it is clear that in the case of the invention disclosed in International Application WO 00/17909 these species cannot come directly from the ion source, as has been taught in the prior art. Accordingly, it is thought that acceleration of the ions in the second direction through the residual gas in the first or second vacuum regions causes some of those ions to interact (for example by resonant charge exchange) with atoms of the residual gas and so produce high energy neutral atoms which, were they to enter the linear quadrupole mass analyser, would interact with metal surfaces that they might strike and so generate ions that pass into the ion detector, thus increasing the background count rate. The configuration of the quadrupole fringe electrodes section of the mass analyser arrangement therefore is such that it causes a diversion of the sample ions that is sufficient to prevent entry of so produced high energy neutral atoms into the linear qaudrupole mass analyser section. That is, the configuration of the set of quadrupole fringe electrodes is such that any ions that may happen to be neutralised will continue in a ballistic trajectory that results in them striking a fringe electrode and so prevent them from reaching the ion detector.

Thus the electrodes of the set of quadrupole fringe electrodes are configured to divert the sample ions from their travel in an entry direction of the ions into the set of quadrupole fringe electrodes prior to their passage into the linear quadrupole mass analyser, and which shield the mass analyser entrance as viewed in the entry direction so as to prevent neutral particles, possibly created by passage of the ion beam in the entry direction through residual gas in the first or second vacuum regions, from entering the linear quadrupole mass analyser.

Furthermore, the ions upon passage through the set of quadrupole fringe electrodes of this invention pass directly into the linear quadrupole mass analyser. That is, the configured set of quadrupole fringe electrodes and the quadrupole electrodes of the linear mass analyser are contained in the same vacuum region and are thus both kept at the same low pressure to minimise collisions of ions with the background gas. Thus this feature of the invention establishes conditions between the configured set of quadrupole fringe electrodes and the linear mass analyser, namely the absence of a pressure gradient and a uniform electrostatic field distribution, which reduce the opportunity for production of the high energy neutral particles which it is thought contribute to the problem that is addressed by the present invention. This structure is contrary to that disclosed by the Yamada et al Patent U.S. Pat. No. 5,939,718.

It is considered there could be two components to the motion of any energetic neutral particle that might have been formed by resonant charge exchange between a high-velocity ion and the background gas. The more obvious component would lie along the direction of travel of the ion beam as it entered the space defined by the set of quadrupole fringe electrodes. The other, less obvious, component would lie along the direction of travel that the ion was following at the instant that the charge exchange occurred. Ions travelling through a space defined by the set of quadrupole fringe electrodes are subject to sinusoidal acceleration by a radiofrequency electromagnetic field applied to the fringe electrodes. This sinusoidal acceleration has a component in a direction perpendicular to the path lying along the geometric centre of the set of fringe electrodes, as defined by the point of intersection of the two lines connecting the centre of one electrode of each pair to that of the diametrically opposite electrode. The orientation and configuration of the set of quadrupole fringe electrodes with respect to the trajectory of the incoming ion beam is chosen to shield the ion detector from neutral particles having either of the two possible components of motion just described.

Preferably the beam of ions directed in the first direction is diverted from this direction through an angle and in a second direction. The magnitude of this angle is such that there is effectively no possibility of light or any other particles (other than ions) from the source reaching the detector. It is considered that an angle of more than 10° is required for this. Preferably the angle is substantial, for example, an angle of about 90° may be employed. Alternatively the ions may be diverted through an angle to bypass a neutral stop and then refocussed into a beam after passing the neutral stop such that they continue substantially in the first direction.

Preferably a first set of electrodes is provided for establishing the electrostatic field for directing the beam of ions in the first direction and preferably a second set of electrodes is provided for establishing the electrostatic field for diverting the beam of ions from the first direction and in a second direction. Preferably the second at least one electrode or set of electrodes is for establishing a reflecting electrostatic field for reflecting the beam of ions from the first direction into the second direction thereby separating said reflected ions from neutral particles and photons from the source which continue through the reflecting electrostatic field and are removed. Use of such a reflecting electrostatic field allows for very efficient removal of such neutral particles and photons.

Preferably the set of quadrupole fringe electrodes comprise four elongate electrodes which are curved to thereby define a curved diversionary path for the ions Alternatively non-curved electrodes may be provided, for example electrode rods which are tilted as described herein below may be provided.

Preferably, with curved elongate quadrupole fringe electrodes, the electrodes are configured such that the ions exit the set generally in the same direction along which they enter the set of electrodes. Thus it is advantageous to configure the set of curved quadrupole fringe electrodes in such a way that the entrance end and the exit end thereof are substantially parallel but not co-linear, being joined by a gently curved section that is approximately the shape of a distorted letter ‘s’. Other configurations are possible so long as the ions are focussed through an aperture and enter the set of quadrupole fringe electrodes in front of the linear mass analyser, the fringe electrodes being so configured that they act to guide the ions along a path that is different from that followed by neutral particles entering the mass analyser arrangement. Such neutral particles are thereby prevented from entering the linear quadrupole mass analyser and subsequently producing ions that would be detected and contribute to the background count rate.

Preferably the electrodes of the set of quadrupole fringe electrodes are configured such that, viewed in the direction of entry of ions into the fringe electrodes, the electrodes at least cover the linear mass analyser and thus the ion detector entrances. That is, the orientation of the curved quadrupole fringe electrodes is such that if at any place the direction of curvature of an electrode is such that an ion accelerated by the RF fields applied by the electrodes might be accelerated in the direction of the ion detector, an electrode portion lies between the accelerated ion and the entrance of the linear mass analyser and thus the detector. This ensures that the ion detector lies in the shadow of a fringe electrode in the event that an accelerated ion becomes a neutral particle by resonant charge exchange with the background gas. This provides very efficient shielding of the ion detector from neutral particles.

For a better understanding of the invention and to show how it may be carried into effect, embodiments thereof will now be described, by way of non-limiting example only, with reference to the accompanying drawings.

DETAILED DESCRIPTION

Figure 1:
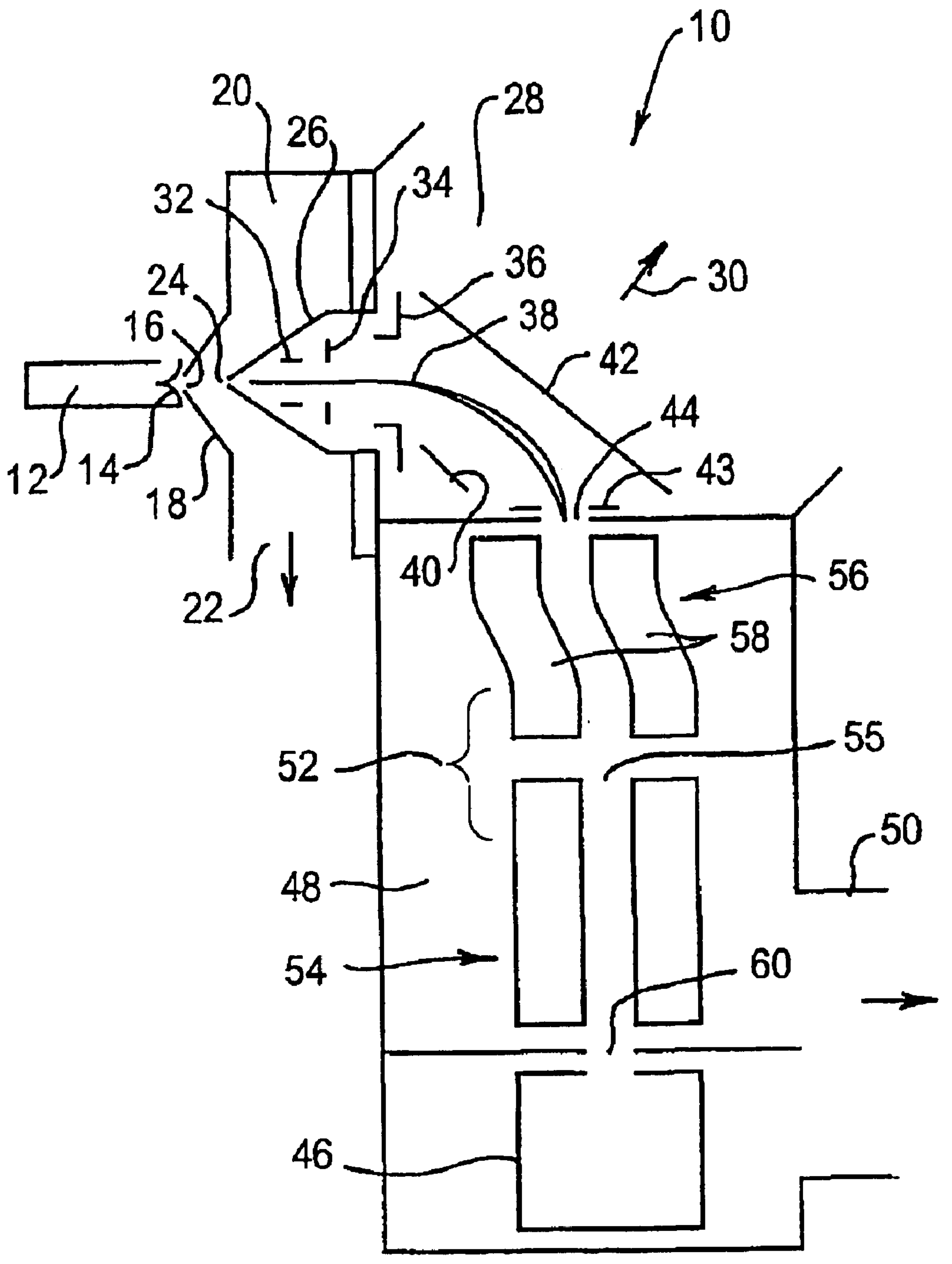
FIG. 1 schematically illustrates a mass spectrometer according to a preferred embodiment of the invention, which includes an ion reflecting optics system.

FIG. 1 shows a mass spectrometer 10 that includes ion production means 12 which is preferably an atmospheric plasma ion source such as an inductively coupled plasma torch. Ion production means 12 is supplied by known means (not shown) with a representative portion of an analytical sample (not shown) and produces a plasma 14 that contains ions representative of the chemical elements present in the analytical sample. The plasma 14 impinges on an aperture 16 in a cooled sampler cone 18. Aperture 16 preferably has a diameter of 1 millimeter and provides an entry into a chamber 20 that is connected through a port 22 to a first vacuum pump (not shown). The pressure in chamber 20 is preferably in the range 2 Torr to 4 Torr. A representative portion of plasma 14 passes through aperture 16 and forms a free jet expansion (not shown). An aperture 24 in a skimmer cone 26 preferably has a diameter of 0.5 mm and is co-axial with aperture 16. The distance between apertures 16 and 24 is preferably in the range 6 to 9 mm. Aperture 24 provides an entry from chamber 20 into a second chamber 28 (shown in part and which constitutes "a first vacuum region" according to the invention) that is connected through a port (indicated by arrow 30) to a second vacuum pump (not shown). The pressure in the second chamber 28 is preferably in the range 0.0001 Torr to 0.0003 Torr. A representative portion of the free jet expansion passes through aperture 24 into the second chamber 28.

A first electrode 32 is located downstream of aperture 24. Electrode 32 is preferably cylindrical and has its axis on an extension of a line joining the centres of apertures 16 and 24. Electrode 32 is preferably at a potential adjustable in the range −300 to −400 volts. A second electrode 34 preferably in the form of a plate with a central aperture is located downstream of the first electrode 32. The centre of the central aperture in electrode 34 lies on the extension of the line joining the centres of apertures 16 and 24, so that electrodes 32 and 34 are co-axial. Electrode 34 is preferably at the same potential as electrode 32. A third electrode 36 preferably in the form of a hollow cylinder mounted on a plate having a central aperture of the same diameter as the internal diameter of the hollow cylinder is located downstream of electrode 34 and is co-axial therewith. Electrode 36 is positioned as indicated in FIG. 1 with the plate downstream of the hollow cylinder. Electrode 36 is preferably at a potential adjustable in the range −100 to −1000 volts.

The combined effect of the set of electrodes 32, 34 and 36 is to produce and direct a beam of positive ions 38 in a first direction. As ion beam 38 travels in the first direction, which is along an extension of the line passing through the centres of aperture 16 and 24 and the centres of electrode set 32, 34 and 36, it is accompanied by a beam of energetic neutral particles and of light from plasma 14. Ion beam 38 is made to follow a different path from said neutral particles and the light by the combined effects of electrode 36, and the electrodes of a second set of electrodes, namely an electrode 40 and an ion mirror 42. The second set of electrodes may optionally include an additional electrode 43. Ion mirror 42 is preferably in the form of a flat ring having four isolated electrode segments thereon (not shown), one electrode segment being located in each of the four quadrants of said ring. Each of the four electrode segments is preferably provided with an independently adjustable potential in the range of 0 to +400 volts. Ion mirror 42 is located so that the line joining the centre of one electrode segment to the centre of the diametrically opposite segment is perpendicular to the extension of the line passing through the centres of apertures 16 and 24 and the centres of electrodes 32, 34 and 36. Electrode 40 is preferably a flat plate and is supplied with an adjustable negative potential, preferably in the range −140 to −1400 volts. Optional electrode 43 is annular and flat and may be grounded or have a small negative voltage (eg. between 0 and −50V) applied thereto. By appropriate adjustment of the potentials applied to electrodes 32, 34, 36 and 40 and to each of the four independent electrode segments of ion mirror 42, ion beam 38 can be diverted (reflected) through a substantial angle, for example 90°, and in a second direction through electrode 43 and into an aperture 44. Any photons or energetic neutrals that originally accompanied ion beam 38 as it emerged from electrode 36 continue in their original direction and proceed through the large central aperture of ion mirror 42. These photons and energetic neutrals are therefore not able to reach an ion detector 46 and thus cannot cause any output from detector 46. Any output from detector 46 that arises from anything other than ions of an elemental isotope of interest is undesirable because it degrades the detection limit for said elemental isotope.

The ring electrode structure 42 also offers the advantage that the ion beam 38 can be steered from side to side (i.e. into or out of the plane of the drawing) by applying a voltage differential between opposite electrode segments of ion mirror 42. Similarly, by applying a differential voltage between the other two electrode segments, the focus of the ion beam 38 can be steered forwards or backwards (i.e. in a direction towards or away from the electrode 40). Thus it is possible to electrically steer the ion beam 38 so that its focus coincides with the entrance into a mass analyser arrangement 52 through aperture 44.

Aperture 44 leads into a third vacuum chamber 48 (which constitutes "a second vacuum region" according to the invention) connected through a port 50 to a third vacuum pump (not shown) that keeps the third chamber 48 at a pressure preferably less than 0.00001 Torr. Chamber 48 contains a quadrupole mass analyser arrangement 52 consisting of a set of quadrupole fringe electrodes 56, (one pair of the set is labelled as 58) in front of a linear quadrupole mass analyser 54 at its entrance 55 such that the linear quadrupole mass analyser 54 receives ions directly from the set of fringe electrodes 56. An exit aperture 60 and the ion detector 46 are placed in the third chamber 48 to receive ions from ion beam 38 after they have been separated according to their mass to charge ratio by linear quadrupole mass analyser 54 for mass spectrometric analysis, as is known in the art.

Figure 6A:
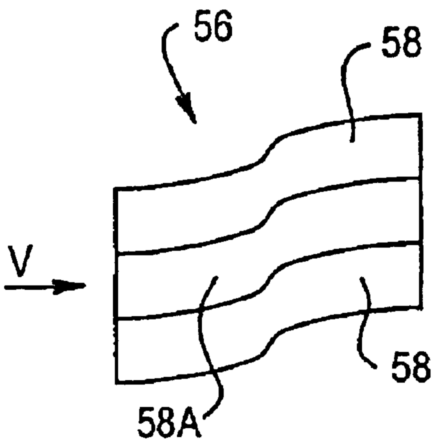
FIGS. 6A and 6B are schematic plan and end views respectively of the set of quadrupole fringe electrodes of the FIG. 1 embodiment.
Figure 6B:
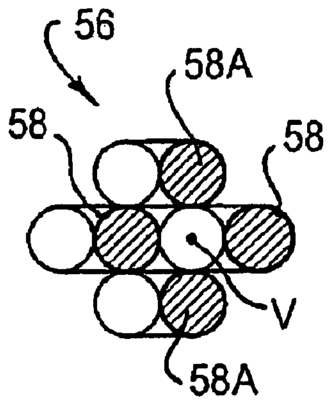

The quadrupole fringe electrodes 56 are configured, that is they are shaped and positioned so that there can be no direct path from aperture 44 to ion detector 46. For example, FIG. 6 shows a preferred arrangement of the four electrodes of the set of fringe electrodes 56 of the embodiment of FIG. 1. FIG. 6A shows a plan view while FIG. 6B shows a view from a direction of the arrow V in FIG. 6A (the entrance ends of the fringe electrodes being shown shaded). Ion beam 38 enters the space between fringe electrode pairs 58 and 58A along the direction of arrow V. Each pair of opposite fringe electrodes 58 and 58A is supplied with a suitable radio frequency voltage (as is known) under the influence of which, ions in ion beam 38 pass through the space defined by fringe electrodes 58 and 58A and are thus diverted before entering the space defined by the linear mass analyser 54 rods. As is known in the art, the path of ions through this space in the linear mass analyser 54 is determined by the radio frequency and DC voltages applied to the rods of mass analyser 54 and by the mass-to-charge ratio of each ion whereby the ions in beam 38 having various mass-to-charge ratios can be passed consecutively to ion detector 46. Accordingly, ion detector 46 produces only a very small output (1 count or less per second) when linear mass analyser 54 is set to transmit ions having a specific mass-to-charge ratio and no ions having that mass-to-charge ratio are present in ion beam 38. FIG. 6B illustrates that the quadrupole fringe electrodes 58 and 58A shield the linear mass analyser 54 entrance 55, that is, the projected areas of the entrance and exit ends of fringe electrodes 58 and 58A cover the entrance area between the rods of the mass analyser 54.

Thus a mass spectrometer 10 as shown in FIG. 1, includes a source 12-16-24 for producing particles including ions 38 representative of chemical elements in a sample together with neutral particles and photons. An ion optics system 32-34-36-40-42-43 is contained in a first vacuum region 28 and includes a first set of electrodes 32, 34, 36 for establishing an electrostatic field for directing a beam of ions 38 in a first direction and a second set of electrodes 40, 42, 43 for establishing an electrostatic field for diverting the beam of ions 38 from the first direction through an angle in a second direction. Neutral particles and photons emanating from the source continue in the first direction and are thereby separated from the beam of ions 38. A quadrupole mass analyser arrangement 52 including a set of quadrupole fringe electrodes 56 and linear quadrupole mass analyser 54 is contained in a second vacuum region 48 for receiving the beam of ions 38 in the second direction. Linear quadrupole mass analyser 54 receives the ions directly from the set of quadrupole fringe electrodes 56 and an ion detector 46 receives the ions from the linear quadrupole mass analyser 54 for spectrometric analysis of the ions whereby concentrations of different elements in the sample are determinable, as is known. The quadrupole mass analyser arrangement 52 and the ion detector 46 are contained in the second vacuum region 48. The set of quadrupole fringe electrodes 56 are configured to divert the ions from the second direction prior to their passage into the linear quadrupole mass analyser 54 and which shield the linear mass analyser entrance 55 as viewed in the second direction. Fringe electrode pairs 58 and 58A of the FIG. 1 embodiment are curved to thereby define a curved diversionary path wherein the entrance end and the exit end of the fringe electrode pairs are substantially parallel but not co-linear. That is, the fringe electrodes 58 and 58A are gently curved to define a path that is approximately a distorted letter 'S' shape.

The invention is not limited to the specific ion mirror and second set of electrodes as described hereinbefore for achieving a desired reflecting electrostatic field distribution. All that is necessary is that the ion mirror structure and the voltages applied to its electrodes establish an electrostatic field in which the field strength varies axially and radially to establish a reflecting field shape. The energy density distribution of such a field could be defined by for eg. a high order multidimensional polynomial equation, or a three-dimensional parabolic or a spherical function. Thus, in addition to varying the voltages applied to the electrodes of an ion mirror, it is within the scope of the invention to vary the number of electrodes, their shape, their spacing, their material composition, the diameter to length (i.e. depth) ratio of the mirror, and the use of "external" electrostatic fields produced by other elements of an ion optical system. It is also within the scope of the invention to provide circumferentially segmented electrodes such that varying voltages can be applied to the segments to provide an electrostatic field of desired shape. The ion mirror structure must of course allow an unobstructed path for neutral particles and photons from the source to pass through the reflecting field.

The quadrupole mass analyser arrangement 52 may be formed as an assembly using ceramic blocks to mount and accurately position the set of fringe electrodes 56 and the rods of the mass analyser 54 relative to each other, as is known.

Figure 2:
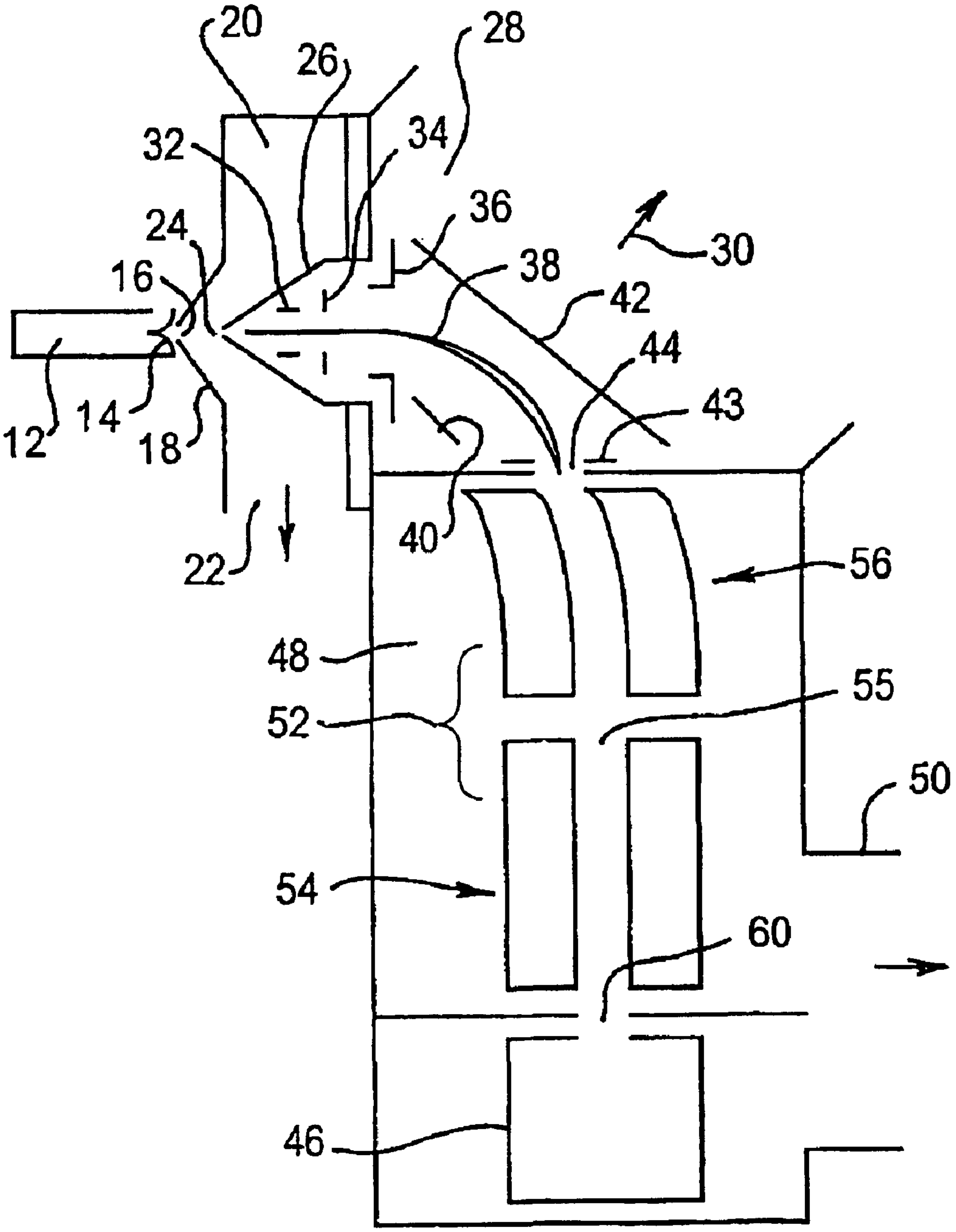
FIGS. 2 to 5 schematically illustrate respective alternative embodiments of the invention having different configurations of the set of quadrupole fringe electrodes.
Figure 3:
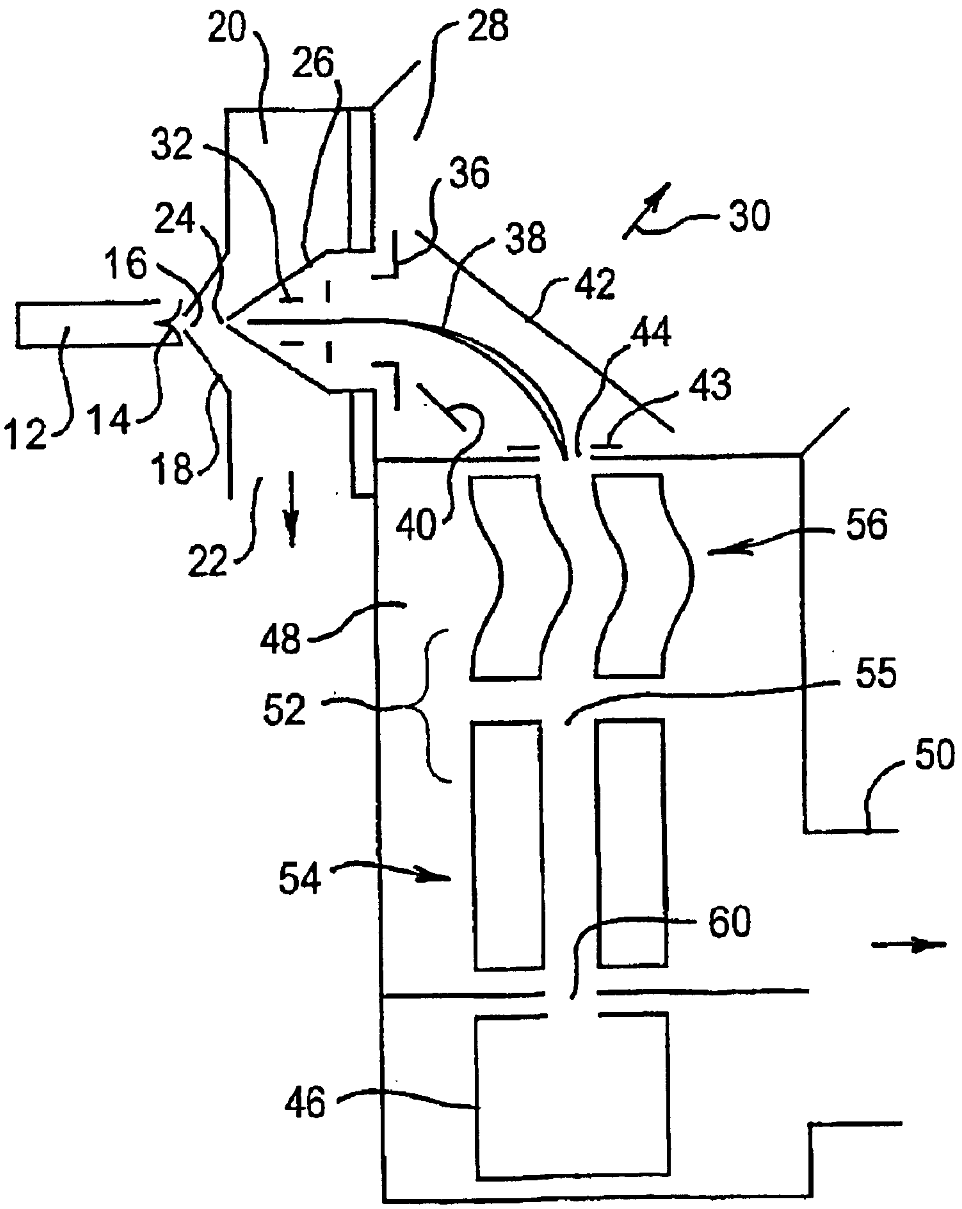
Figure 4:
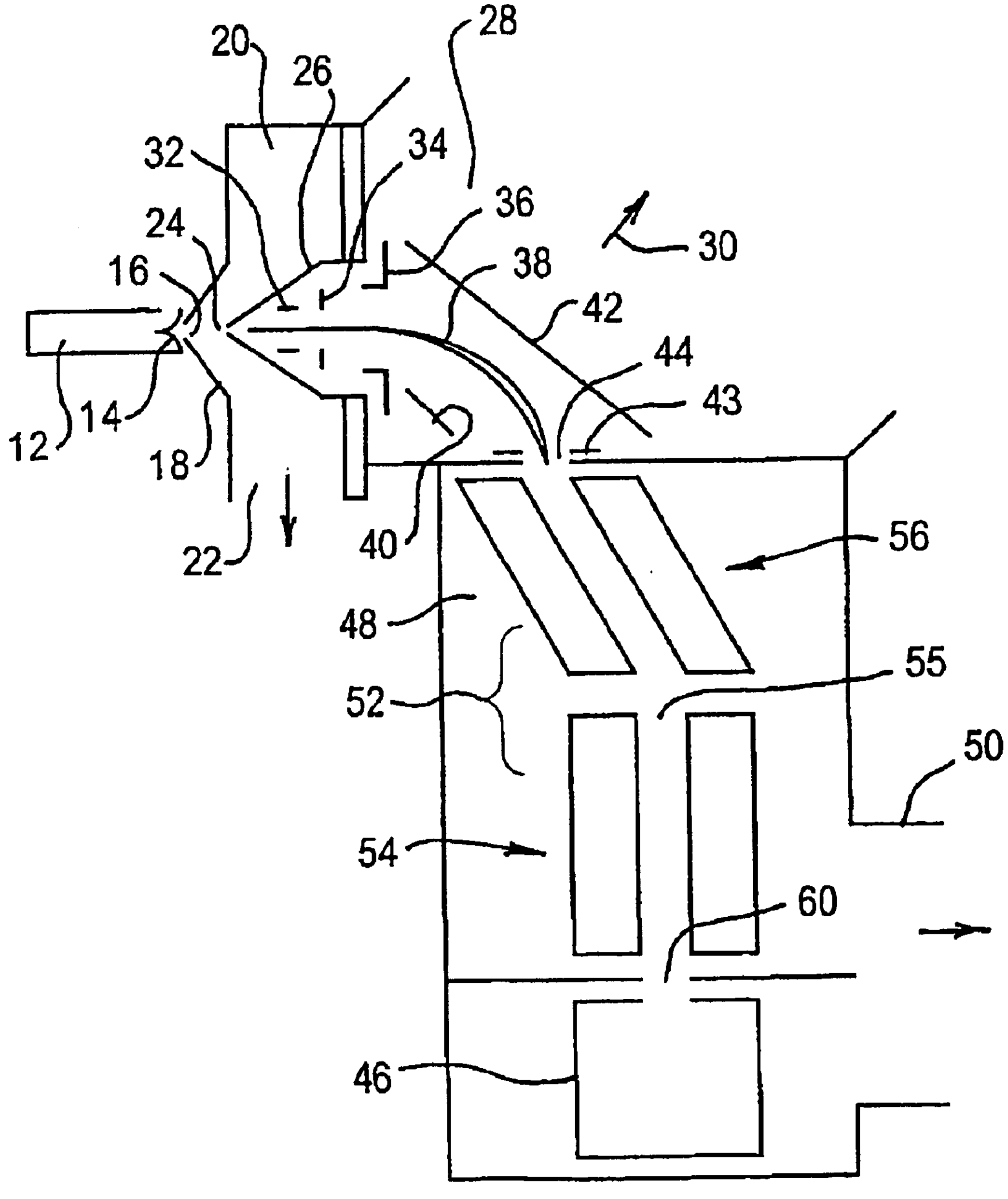
Figure 5:
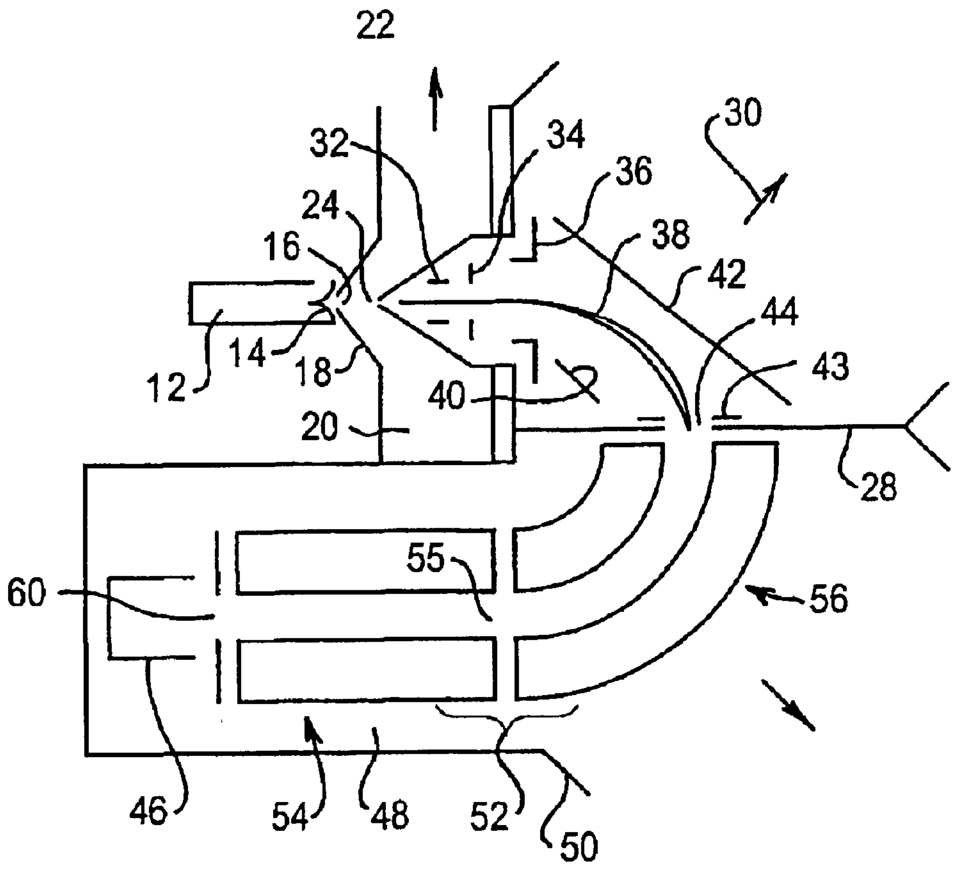

In the embodiments as illustrated in FIGS. 2 to 5, features and components corresponding to those in the FIG. 1 embodiment have been accorded the same reference numerals and will not be further described. The differences between these embodiments resides in the configuration of the respective fringe electrodes 56. Thus FIGS. 2 and 3 illustrate curved configurations for the fringe electrodes 58 and 58A other than the preferred curved configuration of FIG. 1, such that the ions exit the set of quadrupole fringe electrodes 56 generally in the same direction as the path in the second direction along which they enter the quadrupole fringe electrodes. FIG. 4 illustrates a non-curved configuration for the set of fringe electrodes 56. FIG. 5 illustrates another curved configuration for the fringe electrodes 56 for diverting the ions through an angle of 90° from the said second direction. This embodiment allows a compact design for a mass spectrometer. With this embodiment, it would be advantageous to place a barrier under (as viewed in the Fig) the convex side of the quadrupole fringe electrodes 56 to prevent neutrals that might reflect off the electrodes reaching the detector 46 by bypassing the linear mass analyser 54.

To illustrate the improvements achieved with the present invention, Table 1 below shows some performance indicators for an inductively coupled plasma mass spectrometer having ion optics according to the FIG. 1 embodiment but without quadrupole fringe electrodes 56, and the corresponding values for an inductively coupled plasma mass spectrometer according to the FIG. 1 embodiment.

TABLE 1

| Ion optics | Without quadrupole fringe electrodes | FIG. 1 of this disclosure |
|---|---|---|
| Sensitivity for Be (m/z = 9), counts per second per microgram per litre | 500–10,000 | 70,000–110,000 |
| Sensitivity for Mg (m/z = 24), counts per second per microgram per litre | 20,000–100,000 | 250,000–400,000 |
| Sensitivity for Co (m/z = 59), counts per second per microgram per litre | 100,000–300,000 | 400,000–800,000 |
| Sensitivity for In (m/z = =115), counts per second per microgram per litre | 200,000–500,000 | 1,000,000–1,300,000 |
| Sensitivity for Th (m/z = 232), counts per second per microgram per litre | 600,000–1,000,000 | 650,000–1,000,000 |
| CeO +/Ce+, % | 3 | <2.4 |
| Ba++/Ba+, % | <3 | <2.7 |
| Background at m/z = 228, counts per second | 8–25 | <1 |

Figure 7:
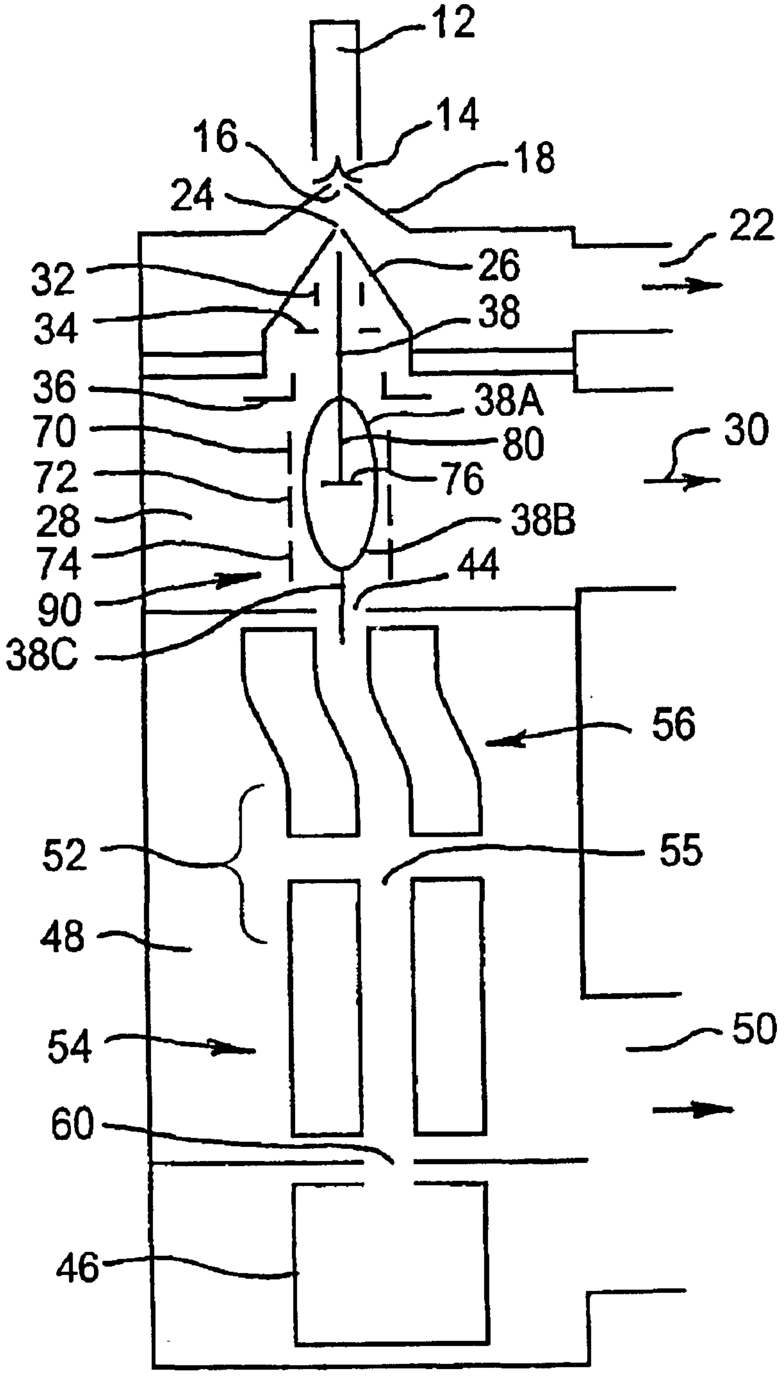
FIG. 7 schematically illustrates a mass spectrometer according to another embodiment of the invention which includes an ion transmissive optics system.

Although the above described embodiments are of mass spectrometers that employ a reflecting ion optics system, the invention may also be embodied in a mass spectrometer that employs an ion transmissive optics system, for example as illustrated by FIG. 7. In the embodiment as illustrated in FIG. 7 features and components corresponding to those in the FIG. 1 embodiment have been accorded the same reference numerals and will not be further described.

In this embodiment, in chamber 28 ion beam 38 enters transmissive ion optics system 90 which comprises cylindrical electrostatic lenses 70, 72, 74 and a disc-shaped neutral stop 76. As is known in the art, application of appropriate DC voltages to electrostatic lenses 70, 72, 74 and to neutral stop 76 can cause ion beam 38 first to diverge (that is, to be diverted from a first direction through an angle—see reference 38A) so that a portion of ions in ion beam 38 travel around neutral stop 76. Photons and neutral atoms from plasma 14 that accompany ion beam 38 continue in the first direction (see straight line 80) and strike neutral stop 76, which thereby shields the entrance 44 to chamber 48 from said photons and neutral atoms. As is known in the art the divergent ion beam 38A, having passed neutral stop 76, is made to converge (see reference 38B) by the combined action of electrostatic fields from lenses 70, 72, 74 and from neutral stop 76. The focussed ion beam as shown at 38C enters chamber 48 through aperture 44 and passes to the quadrupole mass analysing arrangement 52. Thus bent quadrupole fringe electrodes 56 receive the beam of ions and the ions then pass directly into the linear quadrupole mass analyser 54 through entrance 55. By the action of bent fringe electrodes 56, the linear quadrupole mass analyser 54 and ion detector 46 are shielded from background-creating neutral species possibly generated by interaction of focussed ion beam 38C with residual gas in chamber 28 or chamber 48 during the passage of focussed ion beam 38 from the transmissive ion optics 90 to aperture 44 and into the set of quadrupole fringe electrodes 56.

Although FIG. 7 shows the embodiment of the invention as shown in FIG. 1 adapted for use with transmissive ion optics, it is to be understood that all the various embodiments of the invention as illustrated in FIGS. 1, 2, 3, 4 and 5 can also be adapted for use with transmissive ion optics as exemplified in FIG. 7.

Also, other ion transmissive optics systems are known and thus not further described herein. For example, a system could be provided in which the ion beam in a first direction is diverted through an angle and in a second direction instead of being re-focussed after a neutral stop. The requirement is that the ion optics system diverts the sample ions from a particle beam to achieve separation of the sample ions from neutral particles and photons in the beam, thus providing an initial filtering stage. The provision of a quadrupole mass analyser arrangement in which a set of fringe electrodes is located in front of a linear mass analyser provides a second filtering stage in such mass spectrometers. The same as in the embodiments of FIGS. 1–5, the fringe electrodes of a mass spectrometer having an ion transmissive optics system must shield the linear mass analyser entrance in the sense that any energetic neutral particles that are produced having either of the two possible components of motion as described hereinbefore are prevented from entering the linear mass analyser.

Other types of mass spectrometers employing different ionisation and nebulisation techniques to provide the source for producing ions for elemental or isotopic analysis are encompassed by the invention. Examples of such sources, other than an ICP source, are microwave plasma sources and glow discharge sources.

The invention described herein is susceptible to variations, modifications and/or additions other than those specifically described and it is to be understood that the invention includes all such variations, modifications and/or additions which fall within the scope of the following claims.

What is claimed is:

1. A mass spectrometer comprising:

a source for producing particles including ions representative of chemical elements in a sample together with neutral particles and photons, said source characterized by an initial pressure an ion optics system contained in a first vacuum region for receiving particles from the source, the ion optics system comprising at least one first electrode for establishing an electrostatic field for directing a beam of said ions in a first direction from the source and at least one second electrode for establishing an electrostatic field for diverting the beam of ions from the first direction through an angle whereby neutral particles and photons emanating from the source continue in the first direction and are separated from the beam of ions, a quadrupole mass analyzer arrangement contained in a second vacuum region and including a set of quadrupole fringe electrodes for receiving the beam of ions, and a linear quadrupole mass analyzer for receiving ions directly from the set of quadrupole fringe electrodes, and an ion detector also contained in the second vacuum region for receiving ions from the linear quadrupole analyzer, wherein said first vacuum region is characterized by a pressure intermediate said initial pressure and said second vacuum region pressure and the set of quadrupole fringe electrodes are configured to divert the ion beam prior to passage of the ion beam into the linear quadrupole mass analyzer and to shield the linear quadrupole mass analyzer entrance from a substantial portion of the trajectory of the ion beam in said first vacuum region.

2. A mass spectrometer as claimed in claim 1, wherein the at least one second electrode is for establishing an electrostatic filed for diverting the beam of ions from the first direction through an angle and in a second direction, and the set of quadrupole fringe electrodes of the quadrupole mass analyzer arrangement receive the beam of ions in the second direction and shield the linear quadrupole mass analyzer entrance as viewed in the second direction.

3. A mass spectrometer as claimed in claim 1, wherein the ion optics system comprises a first set of electrodes for establishing the electrostatic field for directing the beam of ions in the first direction, and a second set of electrodes for establishing the electrostatic field for diverting the beam of ions form the first direction through said angle.

4. A mass spectrometer as claimed in claim 2, wherein at least one or more electrodes of the ion optics system are for establishing a reflecting electrostatic field for diverting the beam of ions from the first direction though said angle and in the second direction.

5. A mass spectrometer as claimed in claim 1, wherein the electrodes of the set of quadrupole fringe electrodes are elongate and curved to thereby define a curved path to divert the ions prior to their passage into the linear quadrupole mass analyzer.

6. A mass spectrometer as claimed in claim 5, wherein the electrodes of the set of quadrupole fringe electrodes are curved such that the ions exit the set of quadrupole fringe electrodes generally in the same direction as they enter the set of quadruple fringe electrodes, whereby an entrance end and an exit end of the set of quadrupole fringe electrodes are substantially parallel but not co-linear.

7. A mass spectrometer as claimed in claim 5, wherein the electrodes of the set of quadrupole fringe electrodes are doubly curved such that the ions exit the set of quadrupole fringe electrodes generally in the same direction as they enter, whereby an entrance end and an exit end of the set of quadruple fringe electrodes are substantially parallel and co-linear.

8. A mass spectrometer as claimed in claim 5, wherein the electrodes of the set of quadrupole fringe electrodes are curved such that the ions exit the set of quadrupole fringe electrodes in a direction generally at 90° to the direction in which they enter.

9. A mass spectrometer as claimed in claim 1, wherein the electrodes of the set of quadrupole fringe electrodes are elongate and straight, and are tilted relative to an entry direction for the ions into the set of quadruple fringe electrodes to thereby divert the ions from that direction prior to their passage into the linear quadruple mass analyzer.

10. A mass spectrometer as claimed in claim 1, wherein the set of quadrupole fringe electrodes are configured such that as viewed in an entry direction for the ions into the set of quadrupole fringe electrodes, the electrodes of the set at least cover, and thereby shield the linear quadruple mass analyzer entrance and thereby also shield the detector.

11. A mass spectrometer as claimed in claim 1) wherein the angle though which the beam of ions is diverted from the first direction is at least 10°.

12. A mass spectrometer as claimed in claim 2, wherein the angle between the first direction and the second direction is substantial, being greater than 10°.

13. A mass spectrometer as claimed in claim 12, wherein the substantial angle is about 90°.

14. A mass spectrometer as claimed in claim 1, wherein the source for producing particles including ions representative of chemical elements in a sample together with neutral particles and photons is an inductively coupled plasma source.

15. The mass spectrometer of claim 1 wherein said source pressure is in the range of at least 2 to 4 Torr and said second vacuum region is at a pressure of $10^{-5}$ Torr or lower.

* * * * *